(12) United States Patent
Matić et al.

(10) Patent No.: US 12,535,996 B2
(45) Date of Patent: Jan. 27, 2026

(54) NATURAL LANGUAGE MACRO EXPANSION FOR PROGRAMMING LANGUAGES

(71) Applicant: MIKROELEKTRONIKA D.O.O., Belgrade (RS)

(72) Inventors: Nebojša Matić, Belgrade (RS); Ivan Rajković, Belgrade (RS)

(73) Assignee: MikroElektronika D.O.O., Belgrade (RS)

( * ) Notice: Subject to any disclaimer, the term of this patent is extended or adjusted under 35 U.S.C. 154(b) by 171 days.

(21) Appl. No.: 18/161,872

(22) Filed: Jan. 30, 2023

(65) Prior Publication Data

US 2023/0244453 A1  Aug. 3, 2023

Related U.S. Application Data

(60) Provisional application No. 63/304,566, filed on Jan. 28, 2022.

(51) Int. Cl.
*G06F 8/30* (2018.01)
*G06F 9/54* (2006.01)

(52) U.S. Cl.
CPC .............. *G06F 8/31* (2013.01); *G06F 9/547* (2013.01)

(58) Field of Classification Search
CPC .................... G06F 8/31; G06F 9/547
See application file for complete search history.

(56) References Cited

U.S. PATENT DOCUMENTS

| | | | |
|---|---|---|---|
| 4,553,205 A | 11/1985 | Porchia | |
| 5,842,204 A | 11/1998 | Andrews et al. | |
| 6,427,228 B1 | 7/2002 | Wigger | |
| 7,269,822 B2 | 9/2007 | Gebhart et al. | |
| 7,571,431 B2 | 8/2009 | Hampapuram et al. | |
| 8,311,827 B2 | 11/2012 | Hernandez et al. | |

(Continued)

FOREIGN PATENT DOCUMENTS

EP  2304552 B1  11/2019

OTHER PUBLICATIONS

Dybvig, R. K., et al., Expansion-Passing Style: A General Macro Mechanism, 1988, Lisp and Symbolic Computation 1, pp. 1, 53-75.

(Continued)

*Primary Examiner* — Wei Y Mui
*Assistant Examiner* — Brahim Bourzik
(74) *Attorney, Agent, or Firm* — The Harris Firm (57) ABSTRACT

A method is provided including, receiving, at an API server, a natural language string and a context filter defined by automatically generated information about a terminal; selecting, at the API server, one or more domain knowledge files based on the natural language string and the context filter; transmitting, from the API server to a backend server having artificial intelligence capabilities, the one or more domain knowledge files, the natural language string, and the context filter; generating, at the backend server via AI processing, one or more of: one or more macros or one or more strings, based on the one or more domain knowledge files, the natural language string, and the context filter; and receiving, at the API server from the backend server, the one or more of: one or more macros or one or more strings. A system and computer-readable medium are also included.

28 Claims, 10 Drawing Sheets

(56) References Cited

U.S. PATENT DOCUMENTS

| | | | |
|---|---|---|---|
| 8,745,595 B2 | 6/2014 | Uno | |
| 9,229,927 B2 | 1/2016 | Wolfram et al. | |
| 9,235,385 B1 * | 1/2016 | Subashchandrabose | ............... G06F 8/61 |
| 2016/0085749 A1 * | 3/2016 | Bartley | ............ G06F 8/40 715/236 |
| 2018/0315428 A1 | 11/2018 | Johnson et al. | |
| 2018/0349256 A1 * | 12/2018 | Fong | ............ G06F 11/3684 |
| 2019/0026085 A1 * | 1/2019 | Bijani | ............ G06F 8/35 |
| 2019/0324755 A1 * | 10/2019 | Herr | ............ G06F 8/443 |
| 2021/0329081 A1 * | 10/2021 | Singh | ............ G06F 8/38 |
| 2021/0343292 A1 * | 11/2021 | Cox | ............ G06F 8/31 |
| 2021/0397416 A1 * | 12/2021 | Rajesh | ............ G06F 8/31 |
| 2022/0156175 A1 * | 5/2022 | Periyathambi | ...... G06F 11/3688 |
| 2023/0112996 A1 * | 4/2023 | Yang | ............ G06F 8/447 717/153 |
| 2023/0244479 A1 * | 8/2023 | Matic | ............ G06F 8/73 717/120 |
| 2025/0217118 A1 * | 7/2025 | Hicks | ............ G06F 8/40 |

OTHER PUBLICATIONS

Bove, A., et al., A Confluent Calculus of Macro Expansion and Evaluation, Technical Report INCO-91-01, Dec. 1991, Instituto de Computacion, Universidad de la Republica, Uruguay.

Nijkamp, E., et al., A Conversational Paradigm for Program Synthesis, Mar. 25, 2022, Salesforce Research, Retrieve at https://arxiv.org/pdf/2203.13474v3.pdf?.

* cited by examiner

NATURAL LANGUAGE MACRO EXPANSION FOR PROGRAMMING LANGUAGES

BACKGROUND

Field

Embodiments of the present disclosure relate to methods and systems for natural language coding macro expansion for programming languages.

Description of Related Art

U.S. Pat. No. 9,229,927 discloses a method of creating a macro for a natural language (hereinafter, sometimes abbreviated as "NL") query answering system by the one or more computing devices having one or more memory devices, the method comprising: obtaining, by the one or more computing devices and via at least one of (i) a communication network or (ii) a user interface device, a first term or phrase in imprecise syntax, wherein the first term or phrase is to serve as a macro for use with the NL query answering system such that, when the first term or phrase is provided as input to the NL query answering system, which is implemented by one or more computing devices, the NL query answering system will interpret the first term or phrase as representing another term or phrase; obtaining, by the one or more computing devices, a second term or phrase in imprecise syntax; generating, by the one or more computing devices, an association between the first term or phrase and the second term or phrase so that the first term or phrase represents the second term or phrase; storing, by the one or more computing devices, the association as a natural language (NL) macro in the one or more memories so that the NL query answering system can recognize, when the NL query answering system subsequently receives the first term or phrase in an NL input, that the first term or phrase represents the second term or phrase; and determining, by the one or more computing devices implementing NL processing techniques, whether a mismatch between a context of the first term or phrase and a context of the second term or phrase exists, including: determining, by the one or more computing devices implementing NL processing techniques, a meaning of the second term or phrase, comparing, by the one or more computing devices, (i) the meaning of the second term or phrase with (ii) a meaning of the first term or phrase, and determining, by the one or more computing devices, whether a mismatch exists based on the act of comparing.

U.S. Pat. No. 7,571,431 discloses a method of providing macro expansions display in a software development tool, the method comprising: parsing a set of source files of a programming project, the set of source files having at least one macro; performing macro expansion of any macros appearing in the source files; for each source file, collecting information descriptive of the macro expansions of the macros; recording the collected information into separate macro files for each source file; loading the separate macro files into a database such that the macro expansion record information is stored in at least two macro-specific tables, the at least two macro-specific tables comprising: a macro definition table and a macro expansion table; wherein the macro definition table comprises records corresponding to macros, a record corresponding to a given macro comprising: a macro ID uniquely identifying the given macro, and a definition of the given macro; wherein the macro expansion table comprises at least one record corresponding to a macro statement within the source files, the at least one record corresponding to a macro statement comprising: a name field storing name of the source file from which the macro statement using the given macro occurred, a line number field storing line number of the macro statement within the source file, a column number field storing column number where the given macro was used in the macro statement, if the macro statement is nested, macro expansion information comprising nesting order of the given macro within the macro statement, the ID identifying the given macro record in the macro definition table, and wherein there is a separate record in the macro expansion table for each expansion of a nested macro; providing a graphical user interface on a display device; retrieving information of a respective macro expansion for a macro appearing in the source files of the programming project from the database; and within the graphical user interface, presenting a display of the retrieved information of the macro expansion in-line within the source code directly below an occurrence of the macro statement in source code corresponding to the source files.

U.S. Pat. No. 7,269,822 discloses a method for creating a macro module for use with an application program which provides at least one native macro language, the macro module including code written in a non-native macro language to said application program, said method comprising the steps of: storing source code for a program written in a non-native macro language in one or more objects associated with said application program; creating a stub written in a native macro language which initiates execution of the program upon occurrence of a pre-determined event; wherein the non-native macro language is an interpreter language, said method further comprising the step of: storing a means for interpreting programs written in the non-native macro language in one or more objects of the application program.

Nevertheless, prior art methods of and systems for macro expansion suffer from limitations, including hardware limitations, high cost of coding, and vulnerability to typos and other human errors.

SUMMARY

In view of the above circumstances, aspects of the present disclosure provide methods and systems for natural language coding macro expansion for programming languages.

According to an aspect of the present disclosure, there is provided a method including: receiving, at an application processing interface ("APP") server, a natural language string and a context filter defined by automatically generated information about a terminal; selecting, at the API server, one or more domain knowledge files based on the natural language string and the context filter; transmitting, from the API server to a backend server having artificial intelligence capabilities, the one or more domain knowledge files, the natural language string, and the context filter; generating, at the backend server via artificial intelligence ("AI") processing, one or more of: one or more macros or one or more strings, based on the one or more domain knowledge files, the natural language string, and the context filter; and receiving, at the API server from the backend server, the one or more of: one or more macros or one or more strings. Strings can be used as macros or as direct replacement in code. On top of that use of a context filter makes searching, retrieving, and answering much faster and much more focused and precise than classical wide knowledge trained AI.

According to another aspect of the present disclosure, there is provided a system, including: a terminal configured to automatically generate a context filter defined by information about a terminal and accept a natural language string provided by a user; an API server configured to select one or more domain knowledge files based on the natural language string and the context filter; a backend server having artificial intelligence capabilities and configured to generate, via AI, one or more of: one or more macros or one or more strings, based on the one or more domain knowledge files, the natural language string, and the context filter; a network connection from the terminal to the API server configured to transmit the natural language string and the context filter; a network connection from the API server to the backend server configured to transmit the one or more domain knowledge files, the natural language string, and the context filter; a network connection from the backend server to the API server configured to transmit macros or strings; and a network connection from the API server to the terminal configured to transmit macros or strings.

According to yet another aspect of the present disclosure, there is provided a non-transitory computer-readable medium containing instructions, which when executed by one or more processors, cause: an API server to receive a natural language string and a context filter defined by automatically generated information about a terminal; the API server to select and transmit to a backend server having artificial intelligence capabilities one or more domain knowledge files based on the natural language string and the context filter; the API server to transmit the natural language string and the context filter to the backend server; the backend server to generate, via AI, one or more of: one or more macros or one or more strings based on the one or more domain knowledge files, the natural language string, and the context filter; and the backend server to transmit the one or more of: one or more macros or one or more strings to the API server.

DETAILED DESCRIPTION

Embodiments illustrative of techniques, methods, systems, or the like of the present disclosure will be described with reference to the attached drawings. Note that constituents denoted by the same symbols have the same or similar configurations in respective figures.

As used herein, a computer means a general-purpose computer configured to read, write, and execute instructions provided as, for example, machine code.

As used herein, machine code is a stream of raw, usually binary, data. A programmer coding in "machine code" normally codes instructions and data in a more readable form such as decimal, octal, or hexadecimal which is translated to internal binary format by a program called a loader.

As used herein, assembly language is any low-level programming language in which there is a very strong correspondence between the instructions in the language and the architecture's machine code instructions.

As used herein, source code is code in any collection of code written in a format such as plain text understandable by persons having skill in the art.

As used herein, macro means a single instruction given to a computer that produces a set of instructions for the computer to perform a particular piece of work.

As used herein, macro expansion replacing a single string identifier with one or more instructions that can be compiled, evaluated, or executed.

Because of the diversity of devices and contexts in which MCUs can be used, there is a need in the art for easier methods of programming MCUs, since MCUs vary widely in size, shape, and performance characteristics in accordance with the characteristics of the devices in which they are embedded. There are also a wide variety of programming languages and techniques used. Accordingly, embodiments of the present disclosure are useful in simplifying the task of a programmer of MCUs who must work with multiple types of MCUs.

For example, there often exists a universal synchronous and asynchronous receiver-transmitter ("USART") module and data ready flag in the status register in many microcontroller units ("MCUs"), but they have a different name for the status register and a different bit name. But simply by posing the question "What is the name of USART data ready flag?" The present disclosure makes it possible to give the correct string to replace in the destination file with only domain knowledge files as are provided in a datasheet (which is commonly provided by the vendor).

In embodiments, a system for supporting a programmer working on a programming project may include a terminal used by the programmer (user); an API server 1006 with access to domain knowledge files and in communication with the terminal; and a backend server 1008 with artificial intelligence capabilities in communication with the API server. Information about the terminal and various details about the program being worked on at the terminal (hereinafter, also referred to as an "on-going programming project") may be collected and transmitted to the API server 1006 and, subsequently, to the backend server 1008 for context. Just as humans use context to understand the meaning of a phrase or a sentence, context may be used to more accurately interpret a natural language string or to narrow the scope of a search by removing search criteria and results that are out of context. Some specific examples of the information about the terminal may be terminal hardware specifications, hardware specifications of any devices connected to the terminal, firmware or driver information related to any devices connected to the terminal, details regarding any on-going programming projects at the terminal, or the like. Such details about the on-going programming projects might include information about variables being used, types of algorithms employed, or any number of other characteristics.

Here, context may be provided in the form of a context filter made up of a set of values that represent information about the terminal. A software application at the terminal may monitor and collect the information about the terminal automatically in order to build the context filter and update the context filter in the event that any of the collected information items change. Further, a user may choose to manually add, modify, or delete information items (i.e., "customize" the information items) or the information itself in the context filter depending on design specifications, data privacy concerns, etc. The context filter only needs to be transmitted to the API server 1006 when it is initialized and when it is updated, and with respect to the on-going programming project, details therefrom may be updated automatically in accordance with work normally performed by a programmer such that no additional workload on the programmer is necessary to update the context filter.

When the API server 1006 has access to the context filter, the context filter can be used to assist in the search and selection of domain knowledge files by limiting the domain knowledge files to only those that fit within the context of the terminal specifications and the program being worked on at the terminal. Using the context filter can be useful for reducing the amount of time needed to perform a search.

When the backend server 1008 has access to the context filter, the context filter can be used to more accurately and efficiently interpret the natural language string by narrowing possible interpretations thereof. In addition, an AI knowledge base (i.e., domain knowledge files at the backend server) can be updated using a so-called "lazy loading" approach instead of having all files in the knowledge base being initially preprocessed and preprocessing can be limited to only data that fits the context according to the context filter. As an example of this, there may be 10,000 documents that are potential candidates for preprocessing, but the number of documents may be reduced by removing out of context documents in accordance with the context filter, thereby reducing the load of preprocessing needed. Therefore, using the context filter allows for a possible reduction in the amount of processing necessary for the interpreting of the natural language string, may enable the use of fewer resources, and may also enable a reduction of power consumption while at the same time increasing the probability of expected results.

It should be noted that providing context for use such as in the API server 1006 and/or the backend server 1008 as described above can be used with any client software and any type of data containing information in natural language.

After the natural language string is interpreted using the AI capabilities of the backend server 1008, the interpretation is used to generate at least one macro or string to be transmitted back to the API server 1006 and, subsequently, to the terminal as a response to an initial request.

In embodiments, the entirety of the originally entered natural language string is transmitted to the API server unparsed.

Figure 1A:
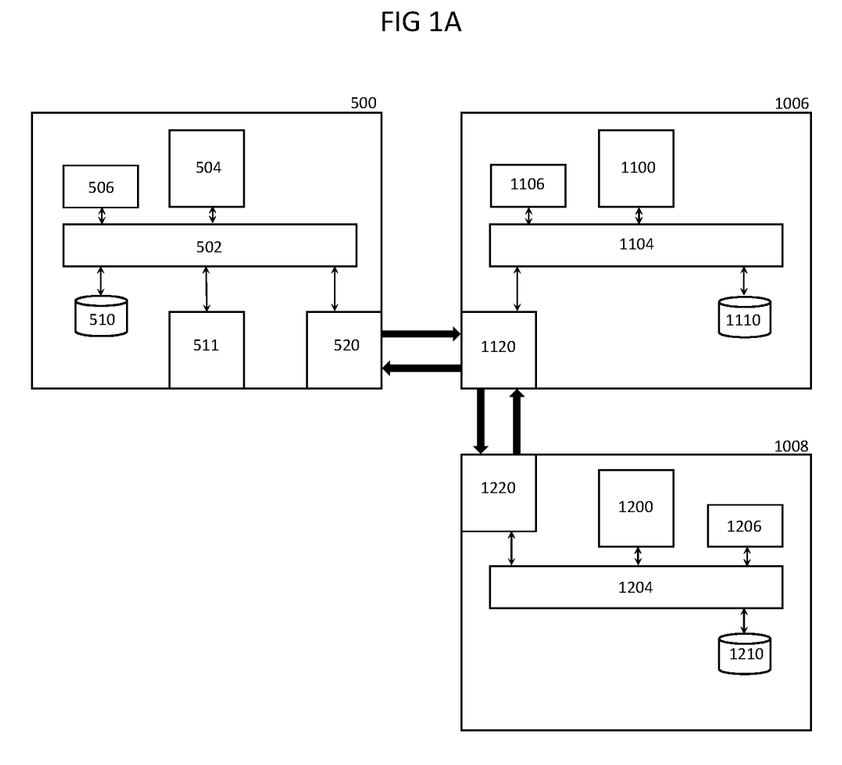
FIG. 1a is a diagram of an example system useful for implementing embodiments.

FIG. 1a illustrates a system having a computer 500, an API server 1006, and a backend server 1008. Light thin arrows indicate bi-directional data communication between elements while thick dark arrows indicate network communication over, for example, a local area network "(LAN")", a wide area network "(WAN")", the Internet, or the like. The computer 500 has a microprocessor 504, main memory 506, storage 510, an input/output "(I/O")" unit 511, and a network interface 520, all of which are connected via a bus 502. The API server has an API microprocessor 1100, API main memory 1106, a domain knowledge file database 1110, and an API network interface 1120, all connected via an API bus 1104. The backend server 1008 has an AI-capable processor 1200, backend main memory 1206, a backend network interface 1220, and backend storage 1210, all connected via a backend bus 1204. The respective network interfaces 520, 1120, and 1220 of each computer or server communicate with each other in a manner illustrated in FIG. 1a.

Figure 1B:
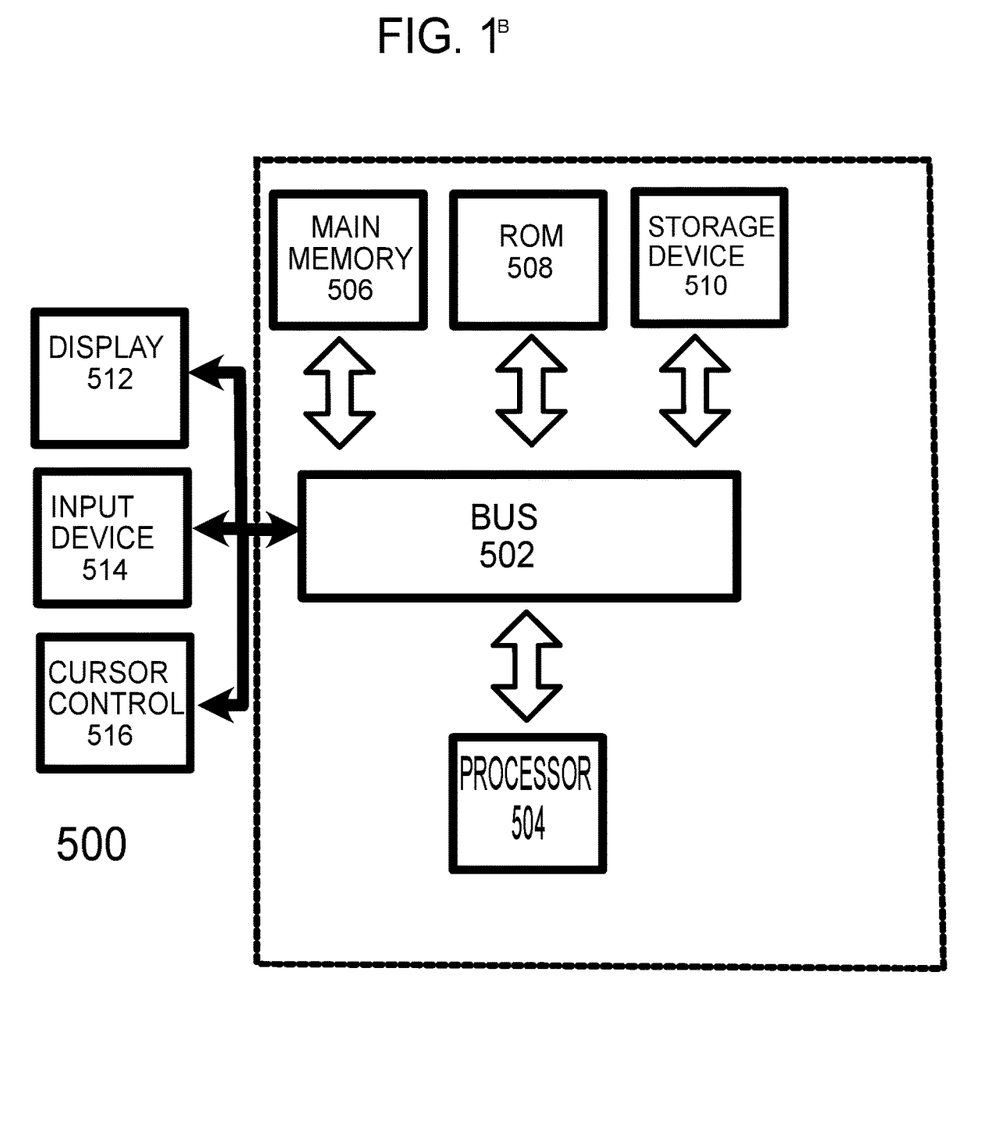
FIG. 1b is a diagram of an example computer useful for implementing embodiments.

FIG. 1b illustrates a general-purpose computer, i.e., the computer 500. Such a general-purpose computer may be customized and configured so as to operate as a special-purpose computer to perform specified operations in accordance with a set of instructions. For implementing embodiments of the present disclosure, a special-purpose computer may function as the backend server 1008 having artificial intelligence capabilities, the API server 1006, or a terminal (not illustrated). The computer 500 includes the bus 502 or other communication mechanism for communicating information and the microprocessor 504 (e.g., a CPU) coupled with the bus 502 for processing information.

The computer 500 includes the main memory 506, such as random-access memory (RAM) or other dynamic storage device, coupled to the bus 502 for storing information and instructions to be executed by the microprocessor 504. The main memory 506 may also be used for storing temporary variables or other intermediate information during execution of instructions by the microprocessor 504. Such instructions may, when stored in non-transitory storage media accessible to the microprocessor 504, configure the computer 500 to function as a special-purpose computer capable of performing the operations specified in the instructions.

The computer 500 further includes read only memory (ROM) 508 or other static storage device coupled to bus 502 for storing static information and instructions for the microprocessor 504. A storage device 510, such as a magnetic disk or an optical disk, may be provided and coupled to the bus 502 for storing information and instructions.

The computer 500 may be coupled via the bus 502 to a display 512, such as a cathode ray tube (CRT), for displaying information to a user. An input device 514, including alpha-numeric and other keys, may be coupled to the bus 502 for communicating information and command selections to the microprocessor 504. Another type of user input device may be a cursor control device 516, such as a mouse, a trackball, or cursor direction keys for communicating direction information and command selections to the microprocessor 504 and for controlling cursor movement on the display 512. This input device typically has two degrees of freedom in two axes, a first axis (e.g., x) and a second axis (e.g., y), that allows the device to specify positions on a plane.

Computer system 500 may implement the techniques described herein using customized hard-wired logic, one or more application-specific integrated circuits ("ASICs") or field-programmable gate arrays ("FPGAs"), firmware and/or program logic which in combination with the computer system causes or programs computer system 500 to be a special-purpose machine. According to at least one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process operations described herein.

Figure 2:
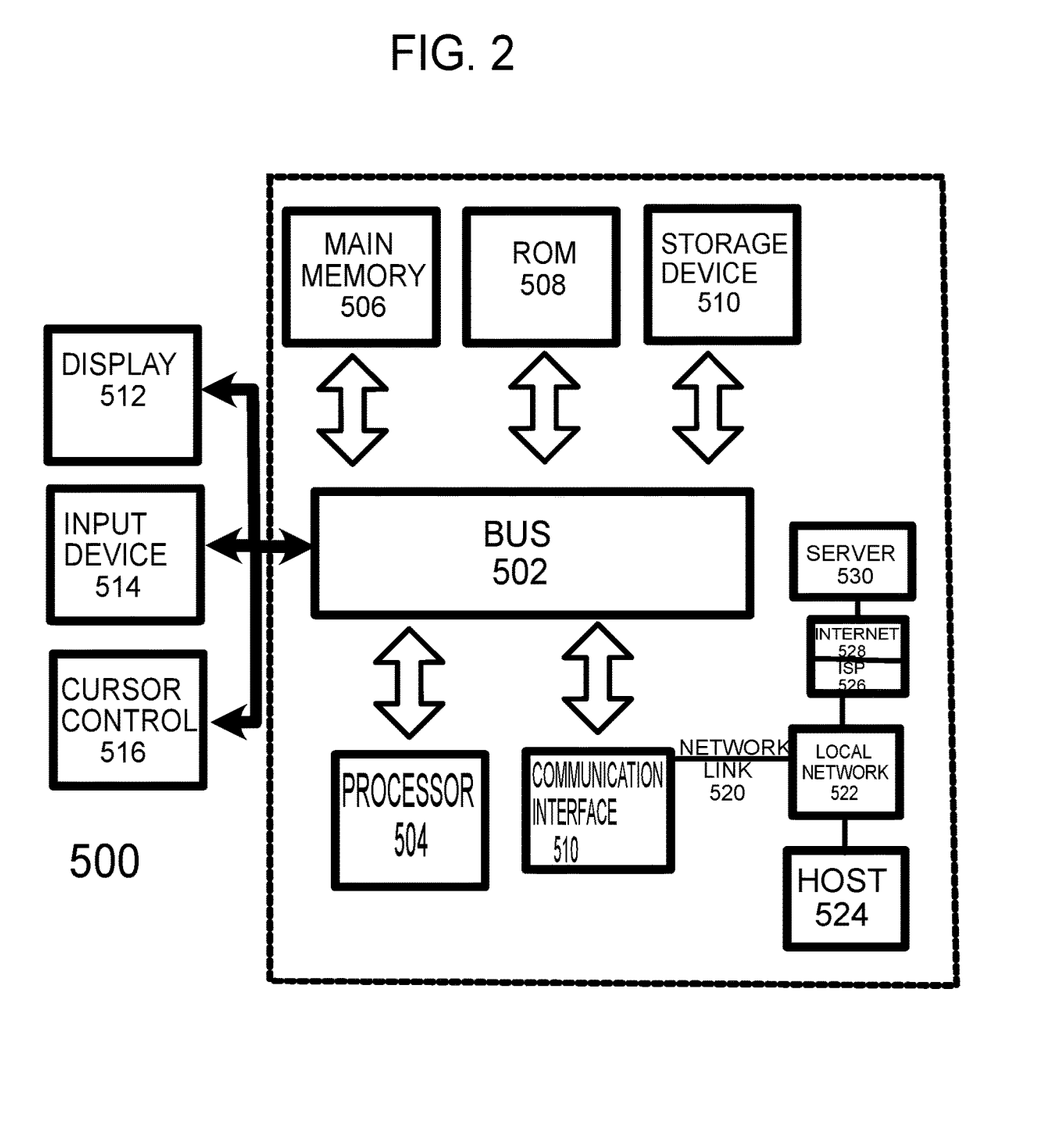
FIG. 2 is a diagram of network features that may be used in embodiments.

FIG. 2 is a diagram of network features that may be used in embodiments. The computer 500 also includes a communication interface 518 coupled to bus 502. A communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, the communication interface 518 may be a local area network (LAN) card to provide a data communication connection to a compatible LAN. Wireless links may also be implemented. In at least one such implementation, the communication interface 518 sends and receives one or more of electrical, electromagnetic, and optical signals (as with all uses of "one or more" herein, "any combination of" one or more of these should be regarded as implicitly included) that carry digital data streams representing various types of information.

Network link 520 typically provides data communication through one or more networks to other data devices. For example, network link 520 may provide a connection through the local network 522 to a host computer 524 or to data equipment operated by an Internet Service Provider (ISP) 526. ISP 526 in turn provides data communication services through the worldwide packet data communication network now commonly referred to as the "Internet" 528. A local network 522 and the Internet 528 both use electrical, electromagnetic, or optical signals that carry digital data streams. The signals through the various networks and the signals on network link 520 and through communication interface 518, which carry the digital data to and from the computer 500, are example forms of transmission media.

The computer 500 can send messages and receive data, including program code, through the network(s), the network link 520, and the communication interface 518. In at least one embodiment of the Internet example, a server 530 might transmit a requested code for an application program through the Internet 528, an ISP 526, the local network 522, and the communication interface 518.

In embodiments, the received code may be one or more instructions executed by the microprocessor 504 as they are received, and/or stored in the storage device 510, or other non-volatile storage for later execution.

Figure 3:
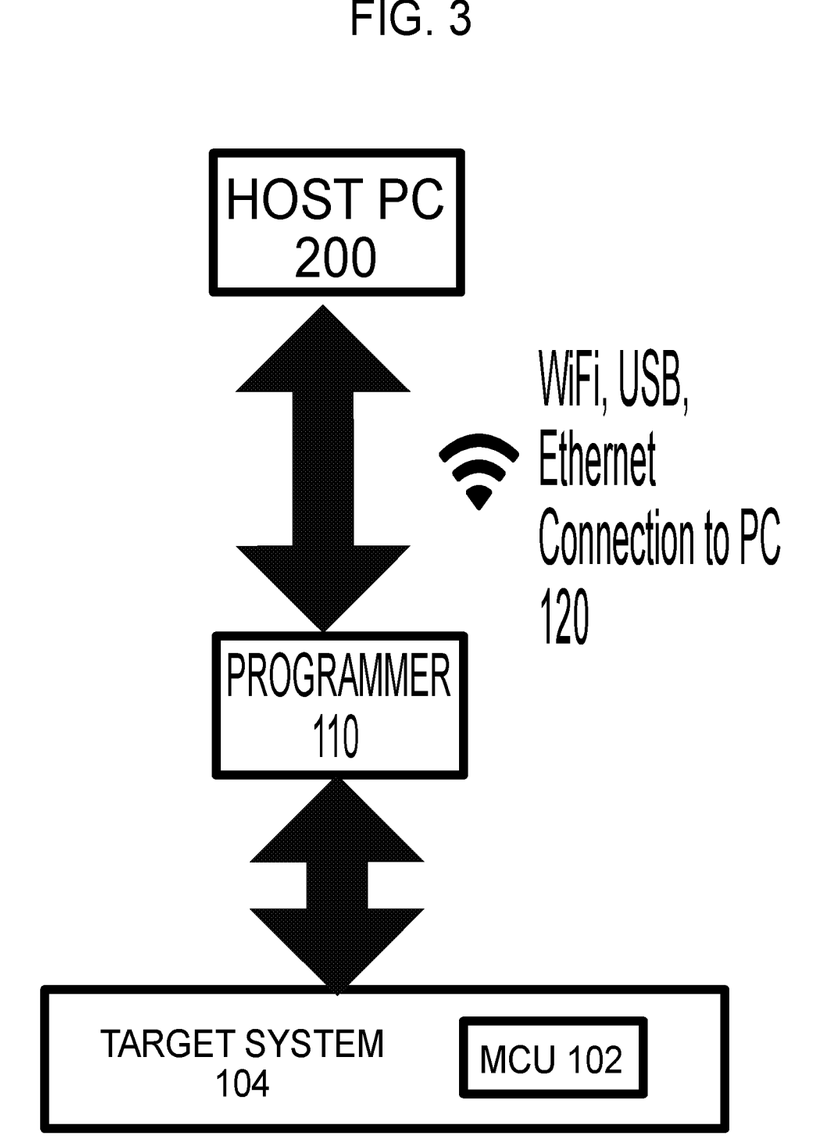
FIG. 3 illustrates a microcontroller unit (MCU) connected to a terminal.

FIG. 3 illustrates a microcontroller unit (MCU) connected to a terminal. Embodiments of the present disclosure are useful in programming an MCU 102 embedded in a target system 104. Once programmed (e.g., firmware stored into MCU 102), the MCU 102 executes code. Microcontroller units (MCUs) are embedded into many modern devices and systems such as transportation vehicles, cooking devices, and medical equipment. MCUs enable sophisticated functionality that cannot be achieved absent an embedded MCU. For instance, events like velocity and acceleration can be measured in real time while code is executing on the MCU 102.

In embodiments, macro expansions can be used to translate between different programming languages at the same or on different levels of abstraction. Macro expansions can translate between assembly language and machine code as well as between source code and assembly code. Macro expansions can also translate between two or more different assembly languages, and between two or more different source code programming languages.

Figure 4:
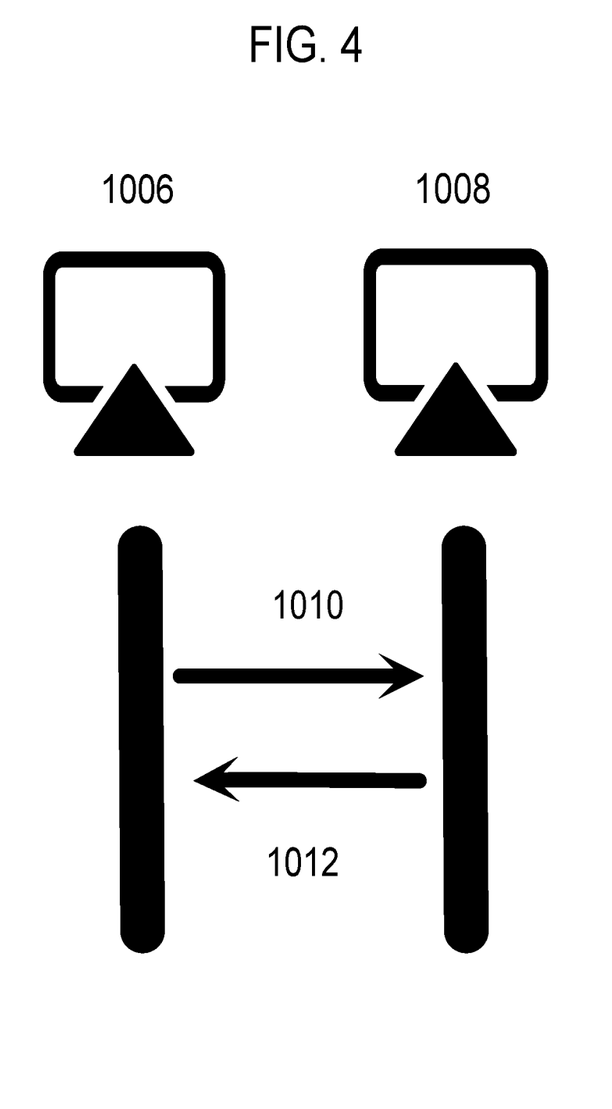
FIG. 4 illustrates an API server connected to a backend server having artificial intelligence capabilities via a network.

FIG. 4 illustrates an API server 1006 connected to a backend server 1008 via a network 1010. The front-end is the code obtained from the API server 1006 that is executed on the client side. This code (typically HTML, CSS, and JavaScript) runs in the user's browser and creates the user interface. The back-end is the code that runs on the server, that receives requests from the clients, and contains the logic to send the appropriate data back to the API server 1006 connected to a network 1012. The backend server 1008 also includes a database which persistently stores all of the data for the application for further reference. In this example, two separate networks are used to illustrate that it is not necessary for the terminal and the backend server 1008 to be on the same network. However, in other embodiments, the terminal, the API server 1006, and the backend server 1008 may be on the same network at no particular disadvantage.

Figure 5:
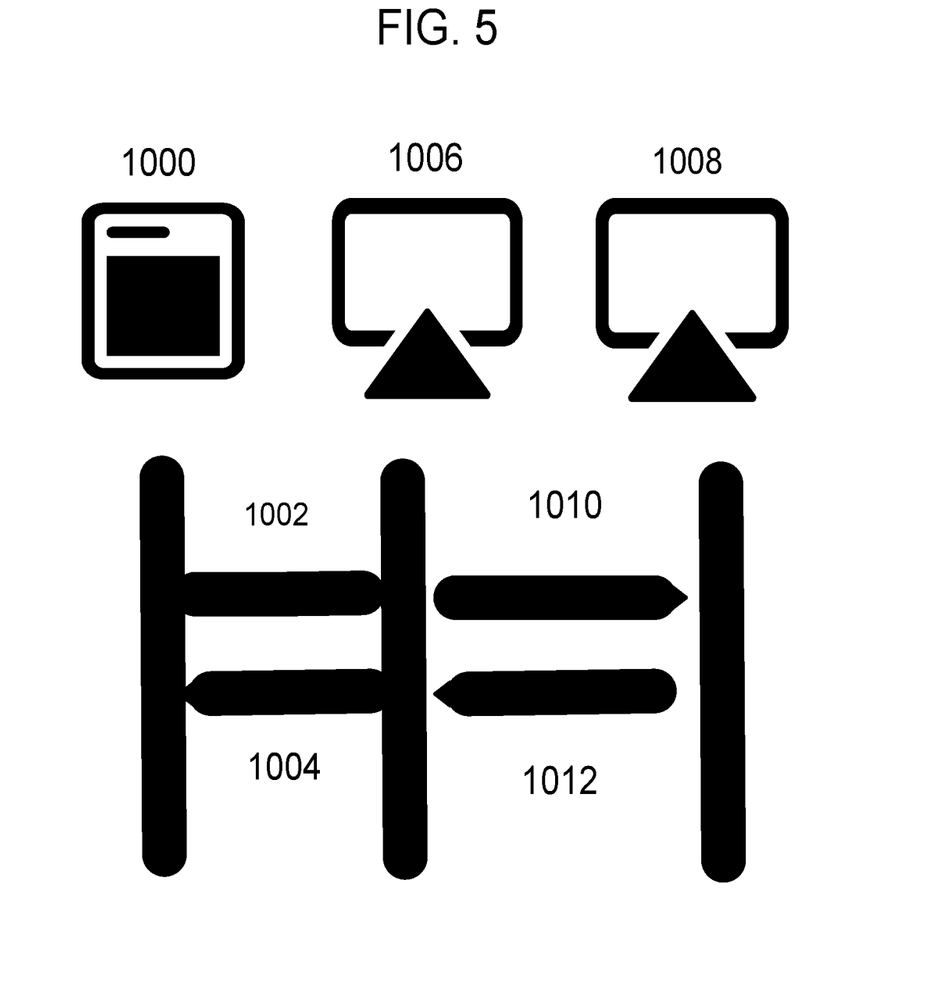
FIG. 5 shows a terminal connected to the API server via a network.

FIG. 5 shows a terminal connected to the API server 1006 via a network. The method begins at stage 1002. At stage 1002, the API server 1006 receives from a client terminal 1000, a document that is formatted in a machine-readable language. At stage 1010, the API server 1006 executes instructions that are formatted in a second machine-readable language. This generates a library that includes instructions that are formatted in a second machine-readable language. The library enables the client device to interface with a backend server 1008. Stages 1004 and 1012 represent the reverse direction of the flow of data through this interface.

Figure 6:
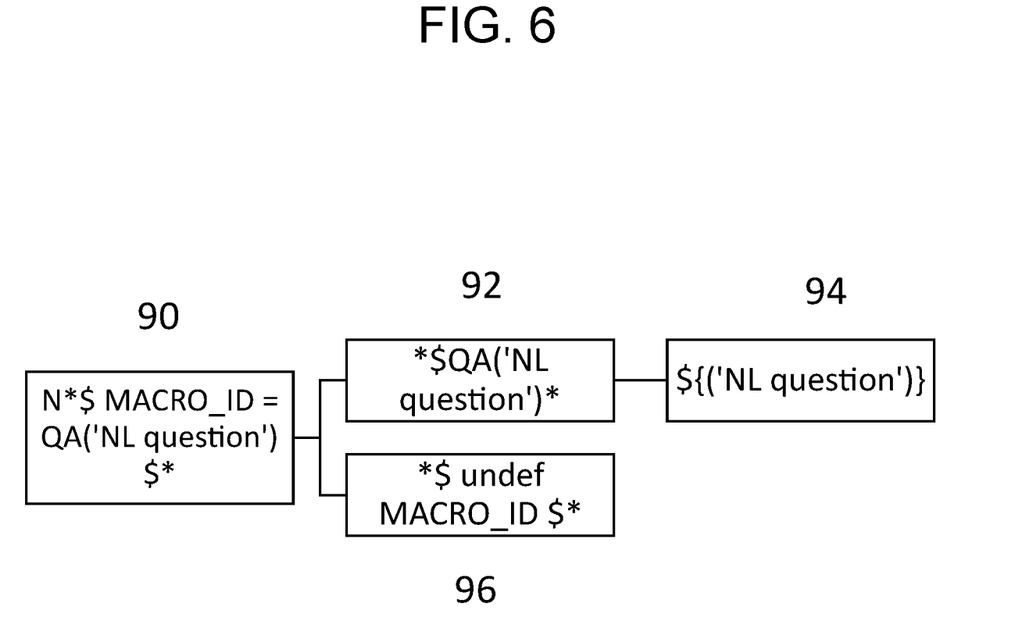
FIG. 6 is an example of an embodiment.

FIG. 6 is an example of a macro. An answer string as macro replacements in code follow the rules set in a query line or query statement. At Step 90, the query line in an embodiment can take the form written inside of a comment such as *$ MACRO_ID=QA ('NL question') $* where MACRO_ID is any identifier that can be found in code and is replaced with the answer which AI returns when presented with the question that is in between Q('as a marker for beginning of the question and') as the end marker. In step 96, MACRO_ID can be un-defined by next syntax *$ undef MACRO_ID $*. Alternatively, in Step 92, *$QA('NL question')* can be entered as the next query line, in which case in Step 94 replacement changes the whole ${('NL question')} query statement with the answer on the spot.

Figure 7:
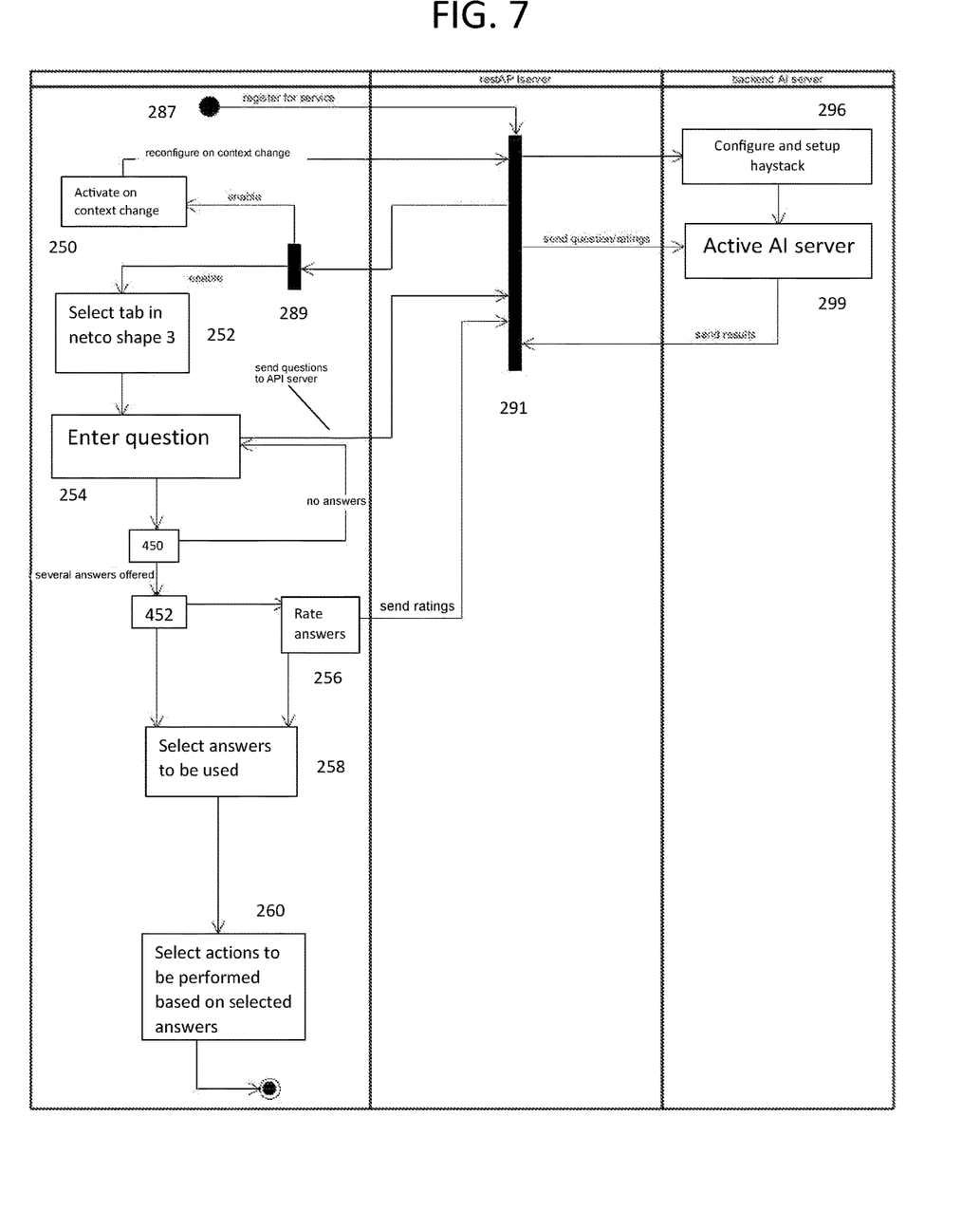
FIG. 7 illustrates a configuration which can be used in embodiments.

FIG. 7 illustrates a configuration which can be used in embodiments.

A device 287 can be the same or a different terminal on which registration for service at an API server 291 is made. A backend AI server 296 configures and sets up a haystack. An active AI server 299 is included in this configuration to provide service. A terminal 289 can enable Subroutine 250 which activates a reconfiguration of the API server 291 (and downstream, the backend AI server 296). Subroutine 252 selects the appropriate domain (tab in NECTO shape 3). Subroutine 254 enters a question. Subroutine 450 offers answers or returns a null result. Subroutine 452 offers the opportunity to rate answers or not. Subroutine 256 sends ratings. Subroutine 258 selects answers to be used. Subroutine 260 selects actions to be performed based on selected answers.

The backend AI server 296 is capable of receiving domain knowledge files as plain text (or any other NL form) and providing answers to NL questions from that domain. A client application may be provided which initiates a connection to the backend AI server 296 for feeding the domain knowledge files, receives a set of files with programming language code as input, generates a set of corresponding output files with the processed question from comments, and replaces macros by answers if they exist.

Users are able to feed domain knowledge files to the QA AI server, and then preprocess any file with programming language. If a computer executing a natural language macro expansion detects a natural language query in the comments of programming language files in a predefined syntax, it finds the answer and uses the answer string as a macro replacement in code following the rules set in the query line or query statement.

Figure 8:
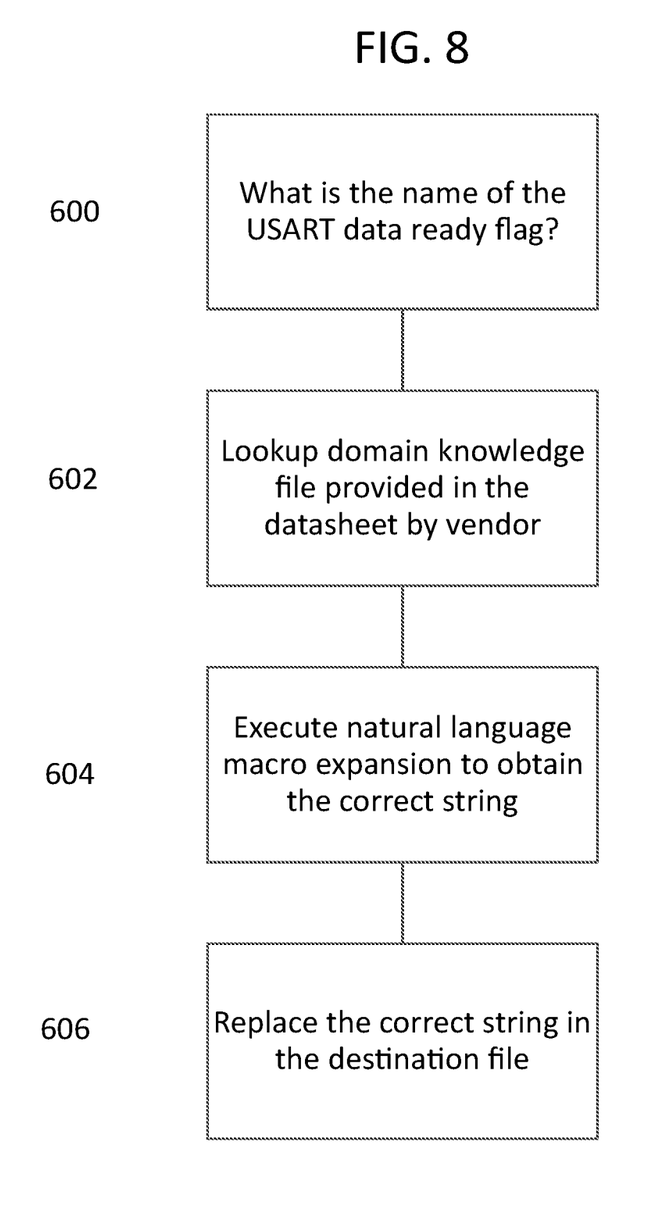
FIG. 8 illustrates an algorithm useful in some embodiments.

FIG. 8 illustrates an algorithm useful in some embodiments.

In step 600, a common question for MCU unit programmers is posed: "What is the name of the USART data flag?" A universal synchronous and asynchronous receiver-transmitter (USART) is a type of a serial interface device that can be programmed to communicate asynchronously or synchronously. A USART module is integrated into many microcontrollers which implement the USART protocol. However, with the large variety of microcontrollers in use, the name of a data flag in a particular device is not generally known to those skilled in the art.

In step 602, a query operation is undertaken to lookup the domain knowledge file containing the name of the USART data ready flag. The domain knowledge file is a datasheet provided by the manufacturer of the device, typically.

Step 604 is a natural language macro expansion. In embodiments, natural language macro expansions run on many configurations of system hardware. Embodiments shown in FIG. 7 and FIG. 9 are system hardware configurations on which the algorithm in FIG. 8 could run, but these embodiments are far from the only embodiments suitable; rather, FIG. 7 and FIG. 9 are only illustrative, and an enormous variety of permutations of system hardware can be useful in other embodiments.

Step 606 is the result of the natural language macro expansion in step 604. In step 606, the name of the USART data flag is replaced in the destination file. Accordingly, by entering the natural language question "What is the name of the USART data ready flag?" the appropriate string is returned, and no further effort is necessary to obtain the string needed to perform tasks related to the microcontroller.

Figure 9:
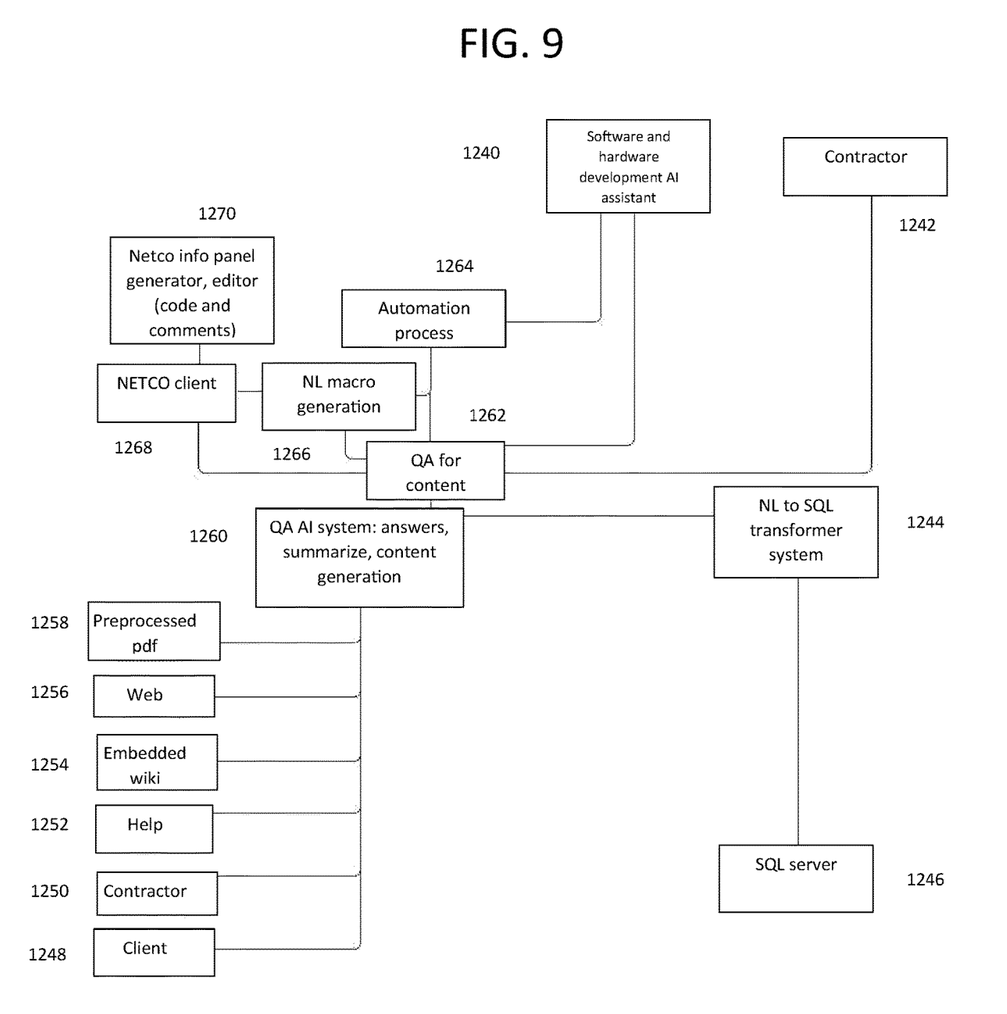
FIG. 9 illustrates another configuration which can be used in embodiments.

FIG. 9 illustrates another configuration which can be used in embodiments.

In this configuration, Contractor 1242 conducts quality assurance for content in the following locations, in some embodiments through the use of a network PC and APIs as previously described herein. NECTO client 1268 is fed by NECTO info panel generator 1270. Data fed by the NECTO info panel generator 1270 is transmitted by a NECTO client 1268 to create NL macros 1266 through the operation of an automation process 1264.

The automation process 1264 is directed by a software and hardware development AI assistant 1240 and a contractor 1242. The automation process 1264 generates NL macros 1266. A QA AI system 1260 (where QA is an abbreviation of "question/answer") compiles a preprocessed pdf 1258, a web crawler 1256, an embedded wiki 1254, help documentation 1252, a contractor 1250, and a client 1248. The QA AI system 1260 is communicatively connected to an NL to SQL transformer system 1244. The NL to SQL transformer system 1244 is communicatively connected to an SQL server 1246.

The embodiments described above are given for the purpose of facilitating the understanding of the present disclosure and does not intend to limit the interpretation of the present disclosure. The respective elements and their arrangements, conditions, or the like of the embodiment are not limited to the illustrated examples but may be appropriately changed. Further, the constituents described in the embodiment may be partially replaced or combined together.

The following numbered clauses set forth various embodiments of the disclosure:

1. At least one (a) computer-implemented method, or
   (b) terminal by way of (i) at least one processor; and at least one memory storing instructions executed by the at least one processor, (ii) means for or (iii) software module(s) for performing operation(s), or
   (c) system by way of (i) at least one processor; and at least one memory storing instructions executed by the at least one processor (ii) means for or (iii) software module(s) for performing operations(s), or
   (d) signal, or
   (e) transitory or non-transitory computer-readable medium containing instructions which when executed by one or more computers each or collectively comprising one or more processors cause operation(s), according to any one or more of the preceding or following clauses, the operation(s) comprising: transmitting, from an API server to a backend server having artificial intelligence capabilities, one or more domain knowledge files; receiving, at the API server, a natural language string and a context filter; transmitting the natural language string and the context filter, from the API server to the backend server; receiving, at the API server, one or more of: one or more macros or one or more strings.

2. A method, terminal, system, signal or, transitory or non-transitory computer-readable medium according to any one or more of the preceding clauses, further comprising transmitting the one or more of: one or more macros or one or more strings from the API server to a terminal.

3. A method, terminal, system, signal or, transitory or non-transitory computer-readable medium according to any one or more of the preceding clauses, further comprising receiving, at the terminal, inputs representing selections of a subset of the one or more of: one or more macros or one or more strings.

4. A method, terminal, system, signal or, transitory or non-transitory computer-readable medium according to any one or more of the preceding clauses, further comprising expanding the subset of the one or more of: one or more macros or one or more strings, at the terminal.

5. A method, terminal, system, signal or, transitory or non-transitory computer-readable medium according to any one or more of the preceding clauses, further comprising receiving, at the terminal, ratings of the quality of one or more of: one or more macros or one or more strings.

6. A method, terminal, system, signal or, transitory or non-transitory computer-readable medium according to any one or more of the preceding clauses, further comprising transmitting the ratings of the quality of one or more of: one or more macros or one or more strings from the terminal to the API server.

7. A method, terminal, system, signal or, transitory or non-transitory computer-readable medium according to any one or more of the preceding clauses, further comprising registering for service at the API server, by a terminal.

8. A method, terminal, system, signal or, transitory or non-transitory computer-readable medium according to any one or more of the preceding clauses, further comprising transmitting a confirmation of the registration for service from the API server to the terminal.

9. A method, terminal, system, signal or, transitory or non-transitory computer-readable medium according to any one or more of the preceding clauses, further comprising transmitting instructions from a terminal to the API server upon any change in context.

10. A method, terminal, system, signal or, transitory or non-transitory computer-readable medium according to any one or more of the preceding clauses, comprising:
a terminal;
an API server;
a backend server having artificial intelligence capabilities;
a network connection from the terminal to the API server configured to transmit natural language strings;
a network connection from the API server to the backend server configured to transmit domain knowledge files;
a network connection from the backend server to the API server configured to transmit macros; and
a network connection from the API server to the terminal configured to transmit macros.

11. A method, terminal, system, signal or, transitory or non-transitory computer-readable medium according to any one or more of the preceding clauses, further comprising an I/O device communicatively connected to the terminal.

12. A method, terminal, system, signal or, transitory or non-transitory computer-readable medium according to any one or more of the preceding clauses, further comprising a network connection from the terminal to the API server configured to transmit inputs received at the I/O device.

13. A method, terminal, system, signal or, transitory or non-transitory computer-readable medium according to any one or more of the preceding clauses, further comprising a network connection from the API server to the backend server configured to re-transmit representations of inputs received at the I/O device.

14. A method, terminal, system, signal or, transitory or non-transitory computer-readable medium according to any one or more of the preceding clauses, further comprising a network connection from the terminal to the API server configured to provide an alert to changes in context and update the context filter,
wherein, when the context filter is updated at the API server, the network connection from the API server to the backend server is further configured to newly provide the context filter to the backend server.

15. A method, terminal, system, signal or, transitory or non-transitory computer-readable medium according to any one or more of the preceding clauses, which when executed by one or more processors, cause:
an API server to transmit, to a backend server having artificial intelligence capabilities, one or more domain knowledge files;
the API server to receive a natural language string and a context filter;
the API server to transmit the natural language string and the context filter to the backend server; and the API server to receive one or more of: one or more macros or one or more strings deduced by AI based on the natural language string, the one or more domain knowledge files, and the context filter.

16. A method, terminal, system, signal or, transitory or non-transitory computer-readable medium according to any one or more of the preceding clauses, wherein the instructions cause the API server to transmit the one or more of: one or more macros or one or more strings to a terminal.

17. A method, terminal, system, signal or, transitory or non-transitory computer-readable medium according to any one or more of the preceding clauses, wherein the instructions cause the API server to receive one or more ratings from a terminal.

18. A method, terminal, system, signal or, transitory or non-transitory computer-readable medium according to any one or more of the preceding clauses, wherein the instructions cause the API server to receive an alert to changes in context from a terminal, update the context filter, and newly provide the context filter to the backend server.

19. A method, terminal, system, signal or, transitory or non-transitory computer-readable medium according to any one or more of the preceding clauses, wherein the instructions cause the API server to send one or more ratings to the backend server.

20. A method, terminal, system, signal or, transitory or non-transitory computer-readable medium according to any one or more of the preceding clauses, wherein the instructions cause the API server to send one or more ratings to the backend server.

21. A method, terminal, system, signal or, transitory or non-transitory computer-readable medium according to any one or more of the preceding clauses, wherein the instructions cause the API server to send confirmation of registration for service.

What is claimed is:

1. A method comprising:
receiving, at an application programming interface (API) server, a natural language string and a context filter defined by automatically generated information about a terminal;
selecting, at the API server, one or more domain knowledge files based on the natural language string and the context filter;
transmitting, from the API server to a backend server having artificial intelligence capabilities, the one or more domain knowledge files, the natural language string, and the context filter;
configuring the backend server based on the natural language string, comprising:
generating, at the backend server via artificial intelligence (AI) processing, one or more of: one or more macros or one or more strings, based only on the one or more domain knowledge files, the natural language string, and the context filter, wherein the one or more macros and the one or more strings are replaced by at least one microcontroller register and bit data, based on the artificial intelligence capabilities, thereby to produce appropriate responses to natural language questions contained within fully executable code needed to perform tasks related to the at least one microcontroller, using only the one or more domain knowledge files, the natural language string, and the context filter; and
receiving, at the API server from the backend server, the one or more of: one or more macros or one or more strings containing the fully executable code.

2. The method according to claim 1, further comprising transmitting the one or more of: one or more macros or one or more strings from the API server to the terminal.

3. The method according to claim 2, further comprising receiving, at the terminal, inputs representing selections of a subset of the one or more of: one or more macros or one or more strings.

4. The method according to claim 3, further comprising expanding the subset of the one or more of: one or more macros or one or more strings, at the terminal.

5. The method according to claim 2, further comprising receiving, at the terminal, ratings of the quality of the one or more of: one or more macros or one or more strings.

6. The method according to claim 5, further comprising transmitting the ratings of the quality of one or more of: one or more macros or one or more strings from the terminal to the API server.

7. The method according to claim 1, further comprising registering for service at the API server, by a terminal.

8. The method according to claim 7, further comprising transmitting a confirmation of the registration for service from the API server to the terminal.

9. The method according to claim 1, further comprising transmitting, from a terminal to the API server, an updated context filter and an alert upon any change in context.

10. A system comprising:
a terminal configured to automatically generate a context filter defined by information about a terminal and accept a natural language string provided by a user;
an application programming interface (API) server configured to select one or more domain knowledge files based on the natural language string and the context filter;
a backend server having artificial intelligence capabilities and configured based on the natural language string, to generate, via artificial intelligence (AI) processing, one or more of: one or more macros or one or more strings, based only on the one or more domain knowledge files, the natural language string, and the context filter, wherein the one or more macros and the one or more strings are replaced by at least one microcontroller register and bit data, based on the artificial intelligence capabilities, thereby to produce appropriate responses to natural language questions contained within fully executable code needed to perform tasks related to the at least one microcontroller, using only the one or more domain knowledge files, the natural language string, and the context filter;
a network connection from the terminal to the API server configured to transmit the natural language string and the context filter;
a network connection from the API server to the backend server configured to transmit the one or more domain knowledge files, the natural language string, and the context filter;
a network connection from the backend server to the API server configured to transmit macros or strings; and
a network connection from the API server to the terminal configured to transmit macros or strings.

11. The system according to claim 10, further comprising an input/output (I/O) device communicatively connected to the terminal.

12. The system according to claim 11, further comprising a network connection from the terminal to the API server configured to transmit inputs received at the input/output I/O device.

13. The system according to claim 12, further comprising a network connection from the API server to the backend server configured to re-transmit representations of inputs received at the input/output I/O device.

14. The system according to claim 10, further comprising a network connection from the terminal to the API server configured to provide an alert to changes in context and transmit an updated context filter.

15. A non-transitory computer-readable storage medium containing instructions, which when executed by one or more processors, cause:
an application programming interface (API) server to receive a natural language string and a context filter defined by automatically generated information about a terminal;
the API server to select and transmit to a backend server having artificial intelligence capabilities one or more domain knowledge files based on the natural language string and the context filter;
the API server to transmit the natural language string and the context filter to the backend server;
configuring of the backend server based on the natural language string, comprising: the backend server generating, via AI processing, one or more of: one or more macros or one or more strings based on only the one or more domain knowledge files, the natural language string, and the context filter, wherein the one or more macros and the one or more strings are replaced by at least one microcontroller register and bit data, based on the artificial intelligence capabilities, thereby to produce appropriate responses to natural language questions contained within fully executable code needed to perform tasks related to the at least one microcontroller, using only the one or more domain knowledge files, the natural language string, and the context filter; and
the backend server to transmit the one or more of: one or more macros or one or more strings containing the fully executable code to the API server.

16. The non-transitory computer-readable storage medium according to claim 15, wherein the instructions cause the API server to transmit the one or more of: one or more macros or one or more strings to the terminal.

17. The non-transitory computer-readable storage medium according to claim 15, wherein the instructions cause the API server to receive one or more ratings from the terminal.

18. The non-transitory computer-readable storage medium according to claim 15, wherein the instructions cause the API server to receive an alert to changes in context from the terminal.

19. The non-transitory computer-readable storage medium according to claim 15, wherein the instructions cause the API server to send one or more ratings to the backend server.

20. The non-transitory computer-readable storage medium according to claim 15, wherein the instructions cause the API server to send confirmation of registration for service.

21. The method according to claim 1, wherein an entirety of the natural language string is transmitted unparsed.

22. The method according to claim 1, wherein the natural language string is transmitted in addition to other data unparsed.

23. The system according to claim 10, wherein the terminal is configured to transmit an entirety of the natural language string unparsed.

24. The system according to claim 10, wherein the terminal is configured to transmit the natural language string in addition to other data unparsed.

25. The non-transitory computer-readable storage medium according to claim 15, wherein the instructions cause the API server to send an entirety of the natural language string unparsed.

26. The non-transitory computer-readable medium according to claim 15, wherein the instructions are calculated to cause the API server to send the natural language string in addition to other data unparsed.

27. The method according to claim 1, wherein
the automatically generated information about the terminal includes at least one of hardware specifications of the terminal, an operating system of the terminal, connected device hardware specifications of the terminal, connected device firmware specifications of the terminal, and details of an on-going programming project at the terminal.

28. The method according to claim 27, wherein the automatically generated information about the terminal of the context filter is customizable by the user.

* * * * *